(12) United States Patent
Cowan

(10) Patent No.: US 7,741,249 B2
(45) Date of Patent: *Jun. 22, 2010

(54) GEOSYNTHETIC COMPOSITE FOR BOREHOLE STRENGTHENING

(75) Inventor: Kenneth Michael Cowan, Sugar Land, TX (US)

(73) Assignee: Shell Oil Company, Houston, TX (US)

( * ) Notice: Subject to any disclaimer, the term of this patent is extended or adjusted under 35 U.S.C. 154(b) by 1193 days.

This patent is subject to a terminal disclaimer.

(21) Appl. No.: 11/143,347

(22) Filed: Jun. 2, 2005

(65) Prior Publication Data

US 2005/0284666 A1 Dec. 29, 2005

(51) Int. Cl.
*C09K 8/60* (2006.01)
*C09K 8/64* (2006.01)
*C09K 8/02* (2006.01)

(52) U.S. Cl. .................. 507/219; 507/236; 175/650

(58) Field of Classification Search ................ 207/219; 507/219, 236; 175/65

See application file for complete search history.

(56) References Cited

U.S. PATENT DOCUMENTS

| 3,307,967 | A | * | 3/1967 | Vanderbilt et al. | 428/429 |
| 3,536,137 | A | | 10/1970 | Walther | 166/295 |
| 3,759,327 | A | | 9/1973 | Carnes | 166/295 |
| 3,776,311 | A | * | 12/1973 | Carnes et al. | 166/295 |
| 4,042,032 | A | | 8/1977 | Anderson et al. | 166/276 |
| 4,355,122 | A | | 10/1982 | Fan | 523/423 |
| 4,404,107 | A | * | 9/1983 | Cowan et al. | 507/104 |
| 4,427,069 | A | | 1/1984 | Friedman et al. | 166/295 |
| 4,482,015 | A | | 11/1984 | Falk | 166/288 |
| 4,556,109 | A | | 12/1985 | Eilers et al. | 166/295 |
| 4,649,998 | A | | 3/1987 | Friedman | 166/294 |
| 4,669,543 | A | | 6/1987 | Young | 166/276 |
| 4,721,160 | A | | 1/1988 | Parcevaux et al. | 166/293 |
| 4,936,385 | A | | 6/1990 | Weaver et al. | 166/288 |
| 5,101,900 | A | | 4/1992 | Dees | 166/250 |
| 5,145,013 | A | | 9/1992 | Dees et al. | 166/295 |
| 5,154,230 | A | | 10/1992 | Dees | 166/277 |
| 5,159,980 | A | | 11/1992 | Onan et al. | 166/294 |
| 5,178,218 | A | | 1/1993 | Dees | 166/281 |
| 5,258,072 | A | | 11/1993 | Gopalkirshnan et al. | 106/802 |
| 5,443,123 | A | | 8/1995 | Wall et al. | 166/288 |
| 5,849,674 | A | | 12/1998 | Fox et al. | 507/140 |
| 6,034,160 | A | | 3/2000 | Eaton et al. | 524/376 |
| 6,177,483 | B1 | | 1/2001 | Tehrani et al. | 523/130 |
| 2003/0092582 | A1 | | 5/2003 | Reddy et al. | 507/100 |
| 2003/0100659 | A1 | * | 5/2003 | Tasaka et al. | 524/487 |
| 2004/0129459 | A1 | * | 7/2004 | Guichard et al. | 175/65 |

FOREIGN PATENT DOCUMENTS

| DE | 2624715 | 12/1977 |
| WO | 94/12445 | 6/1994 |
| WO | 97/15746 | 5/1997 |

OTHER PUBLICATIONS

International Search Report dated Sep. 21, 2005.
Written Opinion dated Sep. 21, 2005.

* cited by examiner

*Primary Examiner*—Timothy J. Kugel
*Assistant Examiner*—Atnaf Admasu

(57) ABSTRACT

Disclosed is a composition comprising a chemical formulation useful for creating geosynthetic composites in-situ that includes a melamine-formaldehyde resin in a non-aqueous drilling fluid.

45 Claims, 2 Drawing Sheets

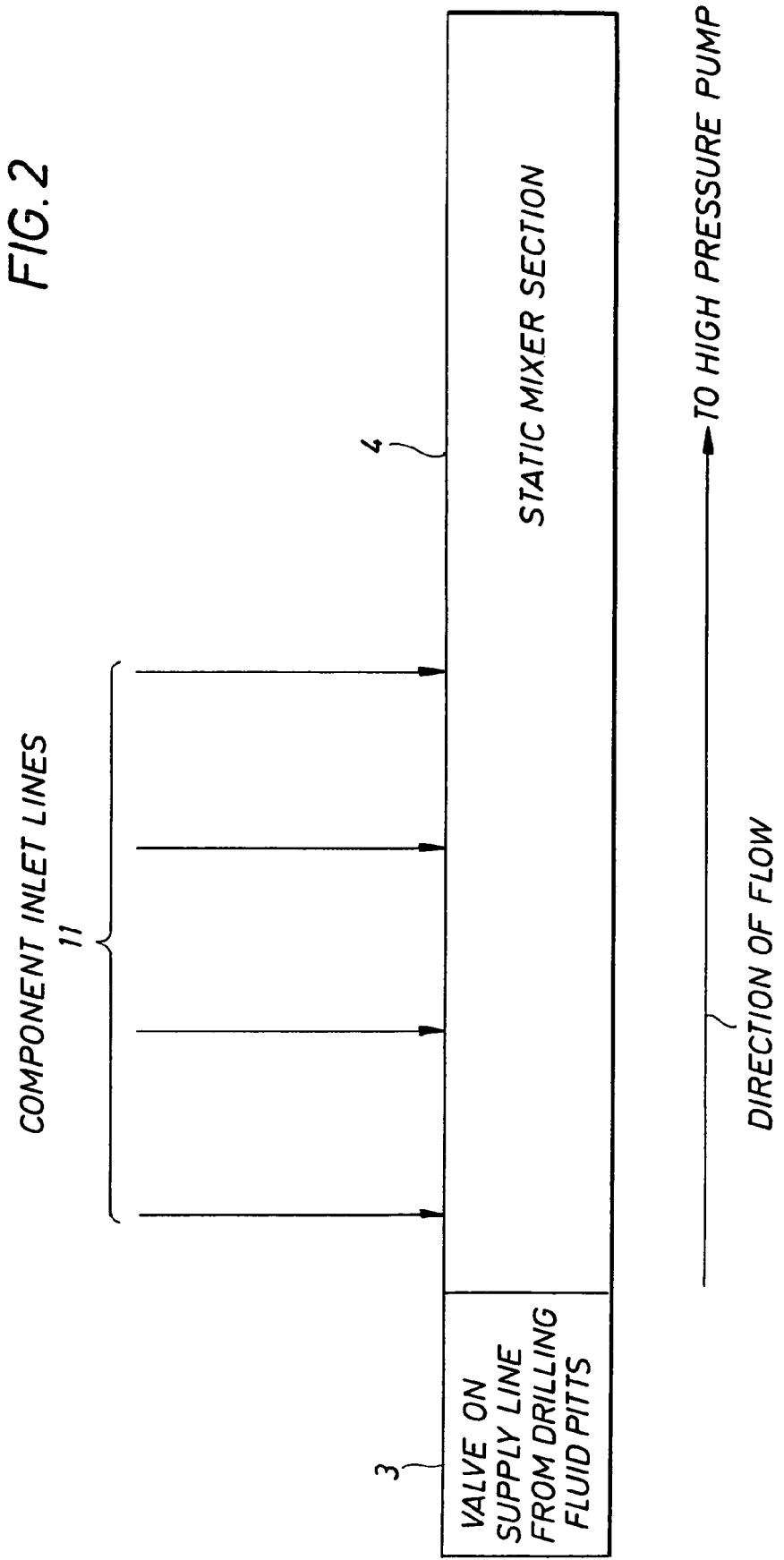

GEOSYNTHETIC COMPOSITE FOR BOREHOLE STRENGTHENING

FIELD OF THE INVENTION

This invention is related to borehole lining treatment technology. More particularly it is related to chemical formulations for creating geosynthetic composites in-situ for strengthening and reinforcing. Still more particularly it is related to chemical formulations for creating geosynthetic composites in-situ that are soluble in one or more non-aqueous or invert emulsion drilling fluids, or drilling fluids made with diesel and mineral oils, and blends of any of said drilling fluids with $C_7$ to $C_{20}$ olefins, esters, and paraffinic oils. Additionally the properties of the formulations can be varied by simply altering the concentration of crosslinking monomer and/or solvent.

BACKGROUND OF THE INVENTION

Boreholes created into the earth for extraction of mineral deposits such as oil and natural gas pass through numerous and varied geologic formations. These geologic formations have varied chemical compositions, permeabilities, porosities, pore fluids, internal (pore) pressures, and material properties. Important material properties that significantly impact well construction operations include compressive strength, tensile strength, fracture initiation pressure, fracture propagation pressure, porosity, Young's (elastic) modulus, Poisson ratio and bulk modulus.

Wide contrasts in formation pressures, formation material properties, and formation fluid types often require isolation and treatment of certain geologic formations. Isolation and treatment may be required to treat a weak formation, to increase near-wellbore fracture initiation pressure, to consolidate weak zones, to cure lost circulation, to reduce formation permeability, to seal off flow zones, to isolate high/low pressure zones, to shut off undesirable water or gas supply, to address damage to the tubing caused by collapse in formation and subsequent damage to pipes, or as a shut off plug for wells which are to be shut off permanently or temporarily, or as a so-called "kick-off" plug to prepare a site for the drilling of a new well from the remaining upper section of a former well. Also, in the drilling of multiple branched wells there is often a need to reinforce and seal the transition zones of the surrounding formation. These transition zones are subject to large mechanical stresses. In addition, there may be weak formations in wells that have been drilled such that they deviate substantially from a vertical position, or where part of the well is horizontal.

Weak formations may result where, for example, the fracture initiation pressure of one formation may be lower than the internal pore pressure of another formation. The increased pressure in a borehole created by penetrating one formation may cause a lower strength formation to fracture. Similarly, the fluid pressure gradient in a borehole required to contain formation pore pressure during drilling may exceed the fracture pressure of another, weaker formation exposed in a borehole.

Attempts may be made to isolate specific formations and reinforce them with steel casing, or with cement or other treatments known in the art. Where steel casings are cemented in a borehole to isolate geologic formations having significantly different properties, each of these casing strings is costly and results in a reduction in the diameter of the borehole in subsequent sections as the borehole is deepened. It is desirable, therefore, to minimize the number of casing strings required to reach the desired depth.

It is known in the art to use cement to line boreholes, however a disadvantage of cement is that the curing step may require up to 24 hours, which is a disproportionately long period of time to wait, especially when the production site is a very costly offshore operation. A further disadvantage of cement is that in view of its particle based structure the material exhibits relatively poor penetration capabilities in formations, which may result in reduced sealing effect.

There are references in the literature using resin based cementing materials for geothermal wellbores. In "New, Novel Well-Cementing Polymer Concrete Composite", American Concrete Institute (ACI), Special Publication 69: "Application of Polymer Concrete", 1981, part 69-5, pp. 73-92, Zelding, A. N., et al describe a system based on resin with initiator and inhibitor, where complete curing of the resin depends on the presence of water. The main component of the resin is organic siloxanes.

WO 94/12445 discloses an alternative material to cement and water slurries, developed for the completion of primary and secondary cementing of deep, hot oil wells with static background temperature in the range of 120-200° C. (248-392° F.). The binder is based on diallyl phthalate resin with the setting/curing time controlled by the addition of a temperature sensitive peroxide initiator and a suitable inhibitor.

Various sealants are known in the art for lining or strengthening boreholes. Where sealants are employed, a resin or monomer must be selected for each well that is compatible with the drilling/completion fluid used. Epoxy resins provide the best comprehensive strength, tensile strength and adhesion properties. However, epoxy resins and/or their curing agents have poor compatibility and poor performance with olefins, esters, and paraffinic hydrocarbon fluid.

WO 97/15746 discloses a composition for sealing different types of zones in oil wells, which includes a monomer, initiator, inhibitor and optional filler as well as other additives.

U.S. Pat. No. 4,556,109 discloses a system based on curing according to a condensation mechanism, rather than free radical polymerization.

Acrylate or methacrylate resins/monomers are available that are soluble in olefin, ester, and paraffinic hydrocarbon fluids. However, alone, these monomers and resins fail to provide the type of material properties required for geosynthetic composite linings. They typically have poor tensile strength, poor fracture toughness, and low compressive strength. Blends of acrylate monomers containing prepolymers have improved tensile strength, compressive strength, and fracture toughness. However, the prepolymers used in these blends are often insoluble in the hydrocarbon fluids previously discussed.

There is a distinct need in the art for chemical formulations which can provide in-situ geosynthetic composites which are completely soluble in non-aqueous drilling fluids, invert emulsion drilling fluids, drilling fluids made with diesel and mineral oils, and combinations thereof, and blends of any of these with olefins, esters, and paraffinic oils. There is also a need for in-situ geosynthetic composites which provide good radial penetration and which set faster.

It would constitute a distinct advance in the art if a formulation were available for forming a composite in-situ that contained a blend of components that could be adapted to provide optimum material properties depending on the properties and conditions encountered in the formation by simply altering the type and concentration of crosslinking monomer and/or solvent and by varying the amount of each component. It would be additionally advantageous if the formulation exhibited improved compatibility with any combination of non-aqueous drilling fluids, invert emulsion drilling fluids, or drilling fluids made with diesel and mineral oils, and any blend of any of said drilling fluids with one or more esters, olefins, and paraffin oils, or combinations thereof.

SUMMARY OF THE INVENTION

The present invention is a composition useful for creating geosynthetic composites in-situ, said composition including a melamine-formaldehyde resin, or blend of suitable melamine-formaldehyde resins; optionally blended with a polyol and/or a poly(hydroxy)ether, or a combination thereof and a non-aqueous drilling fluid. In some embodiments, the drilling fluid is an invert emulsion drilling fluids containing $C_7$ to $C_{20}$ olefins, esters, paraffinic oils and blends thereof, or diesel and mineral oils and blends thereof with $C_7$ to $C_{20}$ olefins, esters, and paraffinic oils. The composition may also include additives to initiate and control time of polymerization selected from: an acidic or acid-generating additive to initiate polymerization. Optionally a reaction retarder or polymerization inhibitor to delay the onset of polymerization until completion of injection into the formation has been completed. The composition may also contain other additives selected from, for example, one or more of a) coupling agents; b) suspending agents; c) dyes; d) weighting agents; e) lost circulation materials; and f) other additives known in the art, or any combination thereof. The formulation, including amounts of each component, the type of acrylate/methacrylate monomer, where applicable, and the chemical composition and material properties of the thermoplastic elastomer, where applicable, are varied to provide the required material properties for the geosynthetic composite formed in-situ by chemical treatment.

BRIEF DESCRIPTION OF THE DRAWINGS

FIG. 2 is a schematic drawing showing an alternative position for component lines.

DETAILED DESCRIPTION OF THE INVENTION

Figure 1:
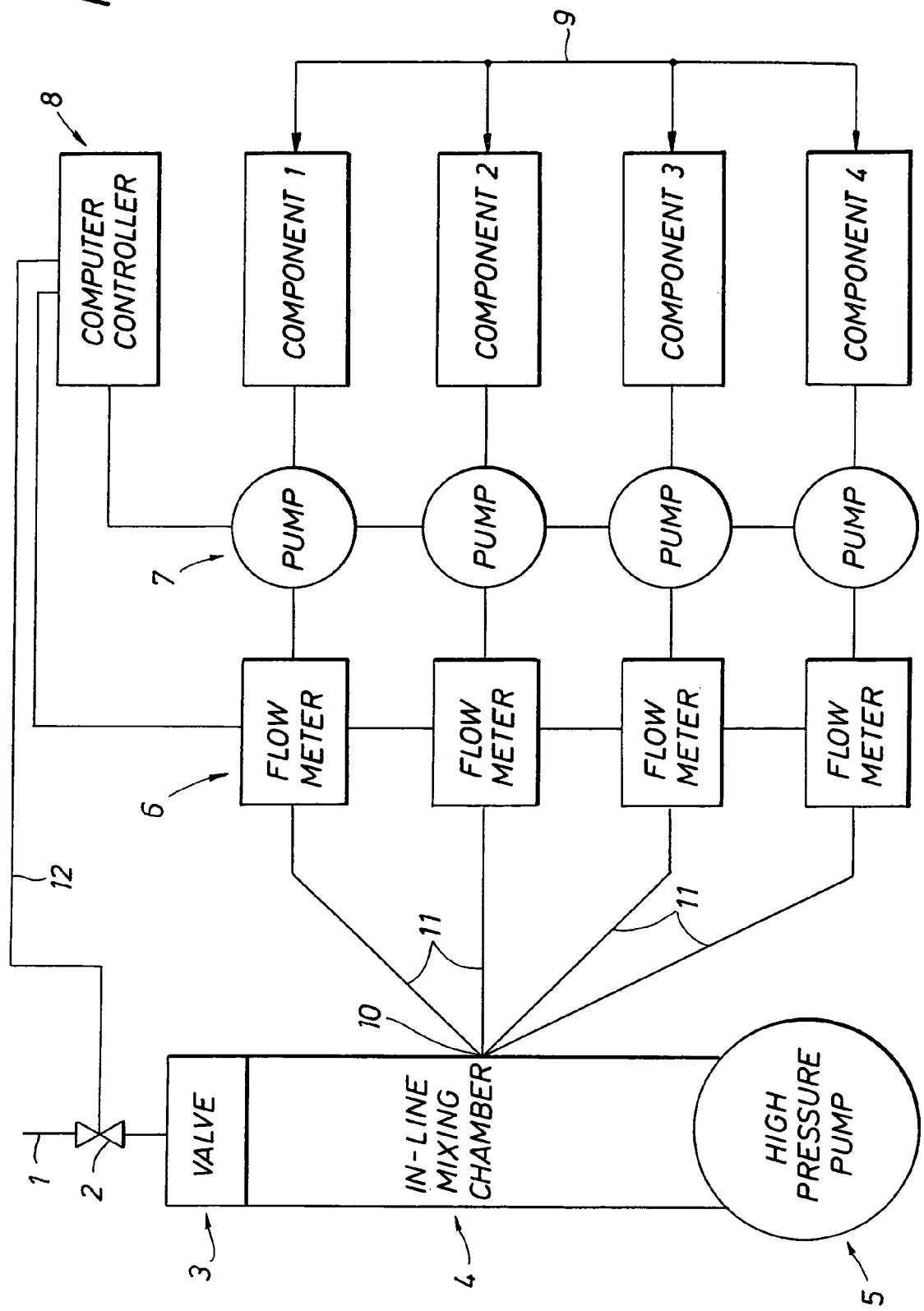
FIG. 1 is a schematic drawing of the in-line apparatus for mixing and pumping the chemical treatment formulations in the present invention.

The present invention provides a chemical formulation for creating geosynthetic rock-plastic composites in-situ. The formulation is compatible, or miscible with, and completely soluble in non-aqueous drilling fluids and invert emulsion drilling fluids containing $C_7$ to $C_{20}$ olefins, esters, paraffinic oils and blends thereof, as well as diesel and mineral oils and blends thereof with $C_7$ to $C_{20}$ olefins, esters, and paraffinic oils. The formulation hardens in the pores of the formation, bonds formation particles together, and forms a rock-plastic composite. The treatment is suitable for application to increase near-wellbore fracture initiation pressure, in depleted zones, over-pressured zones, flow zones, lost circulation zones and other applications that will be apparent to those skilled in the art.

The melamine-formaldehyde component in the formulation is a liquid melamine-formaldehyde resin that is soluble in any hydrocarbon blend selected from one or more of a non-aqueous drilling fluid, an invert emulsion drilling fluid, diesel oil, mineral oil, and any blend of these with a $C_7$ to $C_{20}$ olefin, esters, and paraffin oils, and combinations thereof. Suitable melamine-formaldehyde resins are amino crosslinkers designed for thermosetting surface coatings. Suitable resins should be capable of functioning to crosslink the molecules of the primary film former in a coating to form a three-dimensional thermoset polymer network, which involves the reaction of the functional groups on the amino with complimentary reactive groups on the primary film former. Suitable resins are solvent soluble and contain water extendable melamine. Suitable resins exhibit a versatile catalyzed cure response in a range between about 100° F. to over 600° F., more often between about 150° F. and 350° F. and provide good film flexibility and toughness. Resins are selected for the formulation based on a combination of performance and cure parameters depending on the properties of the formation to be treated.

The melamine-formaldehyde resin may be used alone, may be a blend of suitable melamine-formaldehyde resins, or either may be blended with a polyol or blend of polyols. Suitable polyols must be soluble in the melamine-formaldehyde resin or blend of melamine-formaldehyde resins, and also soluble in the hydrocarbon phase of drilling/completion fluids. Suitable polyols include, for example, but are not limited to ethylene glycol, propylene glycol, glycerol, diethylene glycol, triethylene glycol, polyethylene glycol, polypropylene glycol, and polyethylene-propylene glycol. A suitable amount of polyol is from 0 to 50% by volume, more preferably 5 to 35% by volume, and most preferably 10 to 30% by volume of the formulation. Suitable polyols for use in the present invention are sold commercially under the tradename Voranol Voractiv™ Polyols by Dow Chemical Company.

The melamine-formaldehyde resin or blend of melamine-formaldehyde resins may also optionally be blended with a poly(hydroxy) ether. It is also within the scope of the invention to blend the melamine-formaldehyde resins or blends of resins with a blend of a polyol and a poly(hydroxy) ether. Suitable poly(hydroxy) ether material must be soluble in the melamine-formaldehyde resin or blend of melamine-formaldehyde resins, and also in the hydrocarbon phase of drilling/completion fluids. Suitable poly(hydroxy) ethers include those that are high molecular weight with preferably a predominantly linear structure, which typically provides a combination of toughness and flexibility, and characterized by ether linkages and pendant hydroxyl groups that promote wetting and bonding to polar substrates and fillers.

Suitable poly(hydroxy) ethers include substantially linear polymers having the general formula: -[D-O-E-O]$_n$, wherein D is the radical residuum of a dihydric phenol, E is a hydroxyl containing radical residuum of an epoxide and n represents the degree of polymerization and is at least 30. (See U.S. Pat. No. 4,355,122, incorporated herein by reference)

These poly(hydroxy) ethers can be prepared by admixing from about 0.985 to about 1.015 moles of an epihalohydrin with one mole of a dihydric phenol together with from about 0.6 to 1.5 moles of an alkali metal hydroxide, such as, sodium hydroxide or potassium hydroxide, generally in a solution at a temperature of about 10° C. to about 50° C., until at least about 60 mole percent of the epihalohydrin has been consumed.

The dihydric phenol contributing the phenol radical residuum, D, can be a dihydric mononuclear phenol, a dihydric polynuclear phenol, or mixtures thereof. Preferred dihydric polynuclear phenols include bis(hydroxyphenyl) alkanes, di(hydroxyphenyl) sulfones, di (hydroxyphenyl) ethers, and the like.

The epoxide contributing the hydroxyl containing radical residuum, E, can be monoepoxide or diepoxide. By "epoxide" is meant a compound containing an oxirane group, i.e., oxygen bonded to two vicinal aliphatic carbon atoms.

Suitable epoxides include monoepoxides, diepoxides, saturated epoxides and the like, and mixtures thereof.

Blends of suitable poly(hydroxy) ethers may also be employed. A suitable amount of poly(hydroxy) ether is in the range of from 0 to 50% by volume, more preferably 5 to 35% by volume, and most preferably 10 to 30% by volume of the formulation. Suitable poly (hydroxy) ethers are available commercially under the tradename PAPHEN® Phenoxy Resins from INCHEM Corp. They are available as solids, in solutions, waterborne dispersions, resin blends and micronized powders.

(Also see U.S. Pat. No. 6,034,160, to InChem, incorporated by reference herein in the entirety.)

A solvent may be employed to dilute the blend of the selected formulation, improve wetting of formation surfaces, and improve tolerance to water contamination. The solvent should be miscible with water and hydrocarbons and may be selected from any convenient type, which would be apparent to those skilled in the art. Suitable solvents include, but are not limited to low molecular weight anhydrous alcohols such as methanol, ethanol, propanol; ethers and polyethers, such as tetrahydrofuran, dioxane, ethylene glycol monoalkyl ethers, polyethylene glycol monoalkylethers or glycol ether esters; ether alcohols such as 2-butoxyethanol, or mixtures thereof. Preferred solvents include ethylene glycol monobutyl ether, propylene glycol methyl ether acetate, and other solvents effective for dissolving the thermoplastic elastomer, or mixtures thereof. A suitable concentration of solvent can range from 0 to 50 wt percent, more preferably 1 to 35 wt percent, and most preferably 5 to 25 wt percent.

A catalyst or initiator is useful in the application of the present invention. The use of catalysts and initiators is known in the art and the invention is not intended to be limited to any particular type. An acidic catalyst or acid-producing catalyst is suitable for condensation polymerization of melamine-formaldehyde resins. Suitable catalysts may include, for example, but not be limited to strong acid catalysts such as mineral acids including, for example, hydrochloric acid, sulfuric acid, phosphoric acid, and nitric acid; strong organic acids including sulfonic or para-toluene sulfonic acid, benzene sulfonic acid, xylene sulfonic acid, dinonylnapthalene disulfonic acid, dinonylnapthalene sulfonic acid, and dodecylbenzene sulfonic acid; weak organic acids, including, but not limited to formic, boric, phosphorous oxalic, and acid salts of hexamethylenetetramine, acetic acid, fumaric acid, and formic acid; esters of weak organic acids, including but not limited to butyl acetate, isopropyl acetate, and methyl formate; latent acid catalysts, such as ammonium chloride, alkyl acid phosphates, and phenyl acid phosphates; and acid-producing catalysts such as acid esters or blocked acid catalysts, including but not limited to amine salts of dinonylnapthalene disulfonic acid, dinonylnapthalene sulfonic acid, and dodecylbenzene sulfonic acid, or mixtures thereof. Suitable free radical initiating catalysts or catalyst systems may include, for example, but not be limited to azo compounds, alkyl or acyl peroxides or hydroperoxides, ketoperoxides, peroxy esters, peroxy carbonates, and peroxy ketals, or mixtures thereof. Such compounds vary with respect to activation temperature and half-life or, in other words, the temperature at which their reaction is initiated and becomes extensive. Examples of suitable alkyl peroxides, dialkyl peroxides, hydroperoxides, acyl peroxides, peroxy esters and peroxy ketals include, but are not limited to benzoyl peroxide, dibenzoyl peroxide, diacetyl peroxide, di-t-butyl peroxide, cumyl peroxide, dicumyl peroxide, dilauryl peroxide, t-butyl hydroperoxide, methyl ketone peroxide, acetylacetone peroxide, methylethyl ketone peroxide, dibutylperoxyl cyclohexane, di (2,4-dichlorobenzoyl) peroxide, diisobutyl peroxide, t-butyl perbenzoate, and t-butyl peracetate, or mixtures thereof. The catalyst may be employed in total amounts from about 0.001 to about 20 weight percent based upon the weight of the polymerizable monomer.

Blocked catalysts may be used at elevated temperature to delay the polymerization reaction. Blocked catalysts are amine salts of aromatic sulfonic acids. Examples include the amine salts of dinonylnapthalene disulfonic acid, dinonylnapthalene sulfonic acid, dodecylbenzene sulfonic acid, and para-toluene sulfonic acid, and mixtures thereof. These blocked catalysts do not become effective catalysts until converted to their acid form by temperature. For example, para-toluene sulfonic acid can cure resins at room temperature. The amine salts of para-toluene sulfonic acid will not cure resins below 65° C. to 90° C.

Other additives can be incorporated into the formulation including, but not limited to coupling agents, suspending agents, dyes, weighting agents, and lost circulation materials.

Numerous coupling agents are known in the art and the invention is not intended to be limited to particular agents. Preferred coupling agents include silane coupling agents. A suitable silane coupling agent may be selected from among vinyltrimethoxysilane, vinyltriethoxysilane, vinyltris(β-methoxyethoxy) silane, vinylmethyldimethoxysilane, vinylmethyldiethoxysilane, δ-glycidoxypropyltrimethoxysilane, δ-glycidoxypropylmethyldimethoxysilane, δ-methacryloxypropyltrimethoxysilane, δ-methacryloxypropylmethyldimethoxysilane, acryloxypropyltrimethoxysilane, acryloxypropylmethyldimethoxysilane, N-β-(aminoethyl)-δ-aminopropyltrimethoxysilane, N-β-(aminoethyl)-δ-aminopropyltriethoxysilane, N-β-(aminoethyl)-δ-aminopropylmethyldimethoxysilane, and N-β-(aminoethyl)-δ-aminopropylmethyldiethoxysilane, and mixtures thereof. Also suitable are bifunctional sulfur-containing organo silanes such as, for example, bis-(3-triethoxy-silylpropyl)tetrasulfide, bis-(3-trimethoxy-silyl-propyl) tetrasulfide, and bis-(3-trimethoxy-silylpropyl)tetrasulfide grafted silica, available from DeGussa AG. A suitable concentration for a coupling agent is in the range of 0 to 10 wt percent.

Suspending agents known in the art can be added to the formulation to support solids. The invention is not intended to be limited to any particular agents, however suitable suspending agents include, for example, organophilic clays, amine treated clays, oil soluble polymers, quaternary ammonium compounds, polyamide resins, polycarboxylic acids, and soaps.

The formulation may also contain other common treatment fluid ingredients such as fluid loss control additives, dyes, anti-foaming agents when necessary, and the like, employed in typical quantities, known to those skilled in the art. Of course, the addition of such other additives should be avoided if it will detrimentally affect the basic desired properties of the treatment fluid.

Weighting agents or density materials may be added to the formulation. Suitable materials include, for example, galena, hematite, magnetite, iron oxides, ilmenite, barite, siderite, celestite, dolomite, calcite, manganese oxides, magnesium oxide, zinc oxide, zirconium oxides, spinels and the like. The quantity of such material added, if any, depends upon the desired density of the chemical treatment composition. Typically, weight material is added to result in a drilling fluid density of up to about 9 pounds per gallon. The weighted material is preferably added up to 5 pounds per barrel and most preferably up to 500 pounds per barrel of resin blend.

Lost circulation materials may also be incorporated into the formulation. These materials are generally categorized as fibers, flakes, granules, and mixtures. Specific examples include, but are not limited to, ground mica, mica flakes, silica slag, diatomaceous earth, hydrated borate, graded sand, diatomaceous earth, gilsonite, ground coal, charcoal, cellophane flakes or strips, cellulose fiber, expanded perlite, shredded paper or paper pulp, and the like, walnut or other nut hulls ground to different sizes, cottonseed hulls or cottonseed bolls, sugar cane fibers or bagess, flax, straw, ground hemp, ground fir bark, ground redwood bark and fibers, and grape extraction residue, crystalline silicas, amorphous silicas, clays, calcium carbonate, and barite. Suitable amounts of additional solid agents for use in combination with the copolymer(s) and/or ionomer(s) would be apparent to those skilled in the art.

The formulation and the chemical composition and material properties of the thermoplastic elastomer may be varied to provide required material properties for the geosynthetic composite formed in-situ.

The method and apparatus for utilizing the formulation of the present invention is described in more detail in copending U.S. Ser. No. 60/576,645, which is herein incorporated by reference. Advantages of certain embodiments include reducing the number of casing strings required to create a borehole of a specified depth, eliminating borehole diameter reductions necessitated by isolating geologic formations of significantly different properties with steel casings cemented into the earth at required intervals, and, ideally, allowing the creation of a single diameter or 'monobore' wellbore lined with a single casing, or no more than two casing strings after reaching the required depth. Copending U.S. Ser. No. 60/576,440, is also related to this case and hereby incorporated by reference.

The first step in the method for use of the formulation of the present invention is to determine or estimate the material properties of the exposed geological formation. Certain properties are assessed in order to select the proper treatment. These properties include, for example, fracture initiation pressure, tensile strength, Young's modulus and Poisson Ratio, temperature, porosity and permeability. Methods of obtaining this data are known to those skilled in the art and the invention is not intended to be limited to any particular methods of performing tests to determine these properties.

Once properties of the formation are determined, data may be obtained and analyzed to determine the required changes in material properties of the exposed geological formation that would be desirable to eliminate the need for setting an additional casing string. Given the changes desired the appropriate chemical formulation of the treatment may be selected, the necessary minimum radial penetration distance of the chemical treatment from the wellbore may be determined, and volume of chemical treatment may be determined The treatment process creates a cylindrical shell of a geosynthetic composite extending radially from the wellbore. Elastic modulus, tensile strength, compressive strength, fracture strength, fracture toughness and permeability of this geosynthetic composite are different from the surrounding formation. These properties allow the chemically treated region of the formation to withstand higher stresses (pressure) in the wellbore than the untreated formation without fracturing. The fracture pressure of the chemically treated region is higher than the untreated formation. The permeability of the chemically treated region is typically lower that the untreated formation.

The increased fracture pressure is a function of the material properties of the geosynthetic composite and thickness of the treatment. The change in fracture initiation pressure can be estimated by equations, known in the art of mechanics, specifically rock mechanics, for calculating the fracture strength of formations. The impermeability of the geosynthetic composite is important in the change of fracture initiation pressure. The impermeable, treated portion of the formation acts as an elastic layer re-distributing the pressure applied to the wellbore to the surrounding formation, allowing higher stresses (pressures) to be applied before fracturing or failure of the wellbore occurs. Three modes of failure are possible with the impermeable, geosynthetic composite layer created by treatment of the formation: (a) fracture of the geosynthetic composite, (b) fracture of the untreated formation beyond the thickness of the geosynthetic composite, or (c) plastic failure of the geosynthetic composite. With some modes of failure, the impermeability of the layer is of critical importance and the thickness of the layer is of little importance except for the thickness required to obtain complete impermeability. In other modes of failure, thickness of the layer is of critical importance. The increased fracture pressure may be a function of the material properties of the geosynthetic composite and thickness of the treatment. The change in fracture initiation pressure can be estimated by equations, known in the art of mechanics, specifically rock mechanics, for calculating the fracture strength of formations. The impermeability of the geosynthetic composite is important in the change of fracture initiation pressure. The impermeable, treated portion of the formation acts as an elastic layer re-distributing the pressure applied to the wellbore to the surrounding formation, allowing higher stresses (pressures) to be applied before fracturing or failure of the wellbore occurs. Three modes of failure are possible with the impermeable, geosynthetic composite layer created by treatment of the formation: (a) fracture of the geosynthetic composite, (b) fracture of the untreated formation beyond the thickness of the geosynthetic composite, or (c) plastic failure of the geosynthetic composite. With some modes of failure, the impermeability of the layer is of critical importance and the thickness of the layer is of little importance except for the thickness required to obtain complete impermeability. In other modes of failure, thickness of the layer is of critical importance. Those skilled in the art of geomechanics will be able to use strength of materials principles to calculate the most likely mode of failure and required thickness of a layer to obtain a specific increase in fracture initiation pressure.

The volume of treatment is determined from radial penetration distance from the wellbore, length of interval, wellbore diameter and formation porosity. The volume of the cylindrical shell is calculated and multiplied by the porosity of the formation to estimate the volume of pore space to be filled with the chemical treatment. An excess volume may be added to compensate for the uncertainty in the estimation. The volume of the wellbore over the treated interval must be filled with chemical treatment before or during injection. This volume is also added to the formation treating volume and any excess to yield the required treating volume.

Permeability of the geologic formation to be treated is important. The formation must have sufficient permeability to allow the chemical treatment to flow into pores, displace pore fluids and bond particles of the formation together more strongly. It is desirable to treat formations having matrix permeabilities between 1 millidarcy and 50,000 millidarcy. Penetration rate typically increases with permeability at a constant injection pressure. The pressure required to inject the chemical treatment typically decreases with increasing permeability at a constant flow rate. Formations having permeability less than about 0.1 millidarcy are difficult to treat. Very low viscosity treating fluids, high injection pressures and long treatment times are required for low permeability formations. A practical solution for low permeability formations is to use a ductile, high strength material that requires a small radial penetration distance from the wellbore to achieve the desired increase in fracture pressure.

The amount of time required to perform the treatment is necessary for the formulation of the chemical treatment. The polymerization reaction should occur after injection of the treatment volume into the formation has been completed. However, the polymerization reaction should not occur too long after injection has been completed because dilution or flow-back or cross-flow of fluids within the wellbore is possible. Treatment time is estimated from the sum of time required to pump the chemical treatment into the wellbore adjacent to the geologic formation to be treated, the time required to inject the treatment into the formation, the time to retrieve or withdraw any treating tools or pipes from the treated interval plus a safety margin. Time required to pump the chemical treatment into the wellbore adjacent to the formation to be treated is calculated using the volume of the chemical treatment, the volume of the workstring, and the pump rate. The time required to inject chemical treatment volume into the formation can be calculated using the volume of the chemical to be injected and the filtration rate.

The pseudo-steady-state filtration rate can be determined from a filtration or fluid loss test using a formation core or a synthetic core having filtration properties representative of the geologic formation to be treated. This time to inject the chemical treatment must be less than the time to cure the formulation used. Generally, the borehole is filled over the volume to be treated with the formulation, and then optionally pressurized to the extent desired to force the formulation into the formation at the rate predicted by the filtration rate, plus a margin for errors and inconsistencies. Thus the desired volume of the formulation is forced into the formation over the interval to be treated.

The chemical treatment may be selected based upon a number of considerations, an important one being compatibility with wellbore fluids (i.e. drilling fluids, completion fluids, formation fluids.) The chemical treatment should be compatible with or miscible with wellbore fluids and, most preferably the chemical treatment should be completely soluble in wellbore fluids. In addition, any catalyst or initiator should be compatible with wellbore fluids. For example, in a fluid containing a high amount of acid soluble or acid neutralizing components, one should not use an acid catalyzed chemical treatment fluid. In addition, the selected chemical treatment should be capable of penetrating drilling fluid filter cake or near-wellbore formation damage, commonly referred to as skin.

Additional important factors to consider when selecting the chemical treatment are strength and material properties of the chemical treatment, viscosity of the chemical treatment, initiation or catalyzation type of chemical treatment, wellbore temperature, required placement time of chemical treatment into geological formation, and permeability, porosity, and lithology of the geological formation.

In practice, the thickness of the treated formation (geosynthetic composite) is greater than the minimum thickness required to achieve the desired increase in formation fracture initiation pressure. This is done because of the inhomogeneity of the formation and any variability in the injection process. As a result, the geological formation is treated to improve/increase material property values to the required levels by injecting a chemical treatment into the formation to create a geosynthetic composite extending 0.05 to 5 meters, preferably 0.1 to 3 meters, most preferably 0.25 to 2 meters radially from the borehole. The chemical treatment type and the depth of penetration are interrelated and should be determined based upon the geologic formation type; the permeability and porosity of the untreated formation; the presence of natural or induced fractures, fissures, faults or vugs; and the required material properties of the geosynthetic composite to be formed in-situ by the chemical treatment. Less radial penetration may by required in strong formations or when using high strength chemical treatments. Deeper radial penetration may be required for weak or unconsolidated formations and/or lower strength chemical treatments.

The first step in the method of utilizing the formulation may be to determine or estimate the material properties of the exposed geological formations. These properties may, for example, include the type of geological formation, the permeability and porosity of the untreated formation, and presence of natural or induced fractures, fissures, faults, or vugs. In some embodiments of the present invention the next step may be to determine the required changes in material properties of the exposed geologic formation necessary to eliminate the need for setting a casing string before drilling operations can continue.

With respect to the changes in material properties needed to continue drilling and eliminate the need for setting a casing string, the formulation may be selected taking into consideration compatibility with wellbore fluids, (i.e. drilling fluids, completion fluids, formation fluids), strength and material properties of chemical treatment, viscosity of chemical treatment solution, initiation or catalyzation type of chemical treatment, wellbore temperature, required placement time of chemical treatment in geological formation, and permeability, porosity and lithology of the formation.

The chemical treatment should be at least compatible with wellbore fluids, and preferably completely soluble in wellbore fluids. The catalyst or initiator should also be compatible with wellbore fluids. For example, it would not be optimum to use an acid catalyzed chemical treatment in a fluid containing a high amount of acid soluble or acid neutralizing components. In addition, the chemical treatment should be capable of penetrating drilling fluid filter cake or near-wellbore formation damage. Less radial penetration may be required in strong formations or with high strength chemical treatments, and deeper radial penetration may be required for weak or unconsolidated formations and/or lower strength chemical treatments.

The formation is treated to improve/increase material property values to the required levels by selecting an appropriate treatment formulation and injecting said treatment into the formation to create a geosynthetic composite extending 0.05 to 5 m, more preferably 0.1 to 3 m, and most preferably 0.25 to 2 m radially from the borehole wall.

The chemical treatment formulation of the present invention may be applied to the wellbore through the drill string (BHA), by an open-ended treatment if a large LCM (lost circulation material) is used, by a spot-and-hesitation squeeze, or by a bullhead-and-hesitation squeeze (particularly in a severe loss zone). Preferably the composite will exhibit radial penetration away from the wellbore of 0.25 to 2 m. The monomer/resin formulation hardens in the pores of the formation and bonds formation particles together to form a rock-plastic composite.

After treatment the material properties of the geosynthetic composite are improved over the untreated geological formation. The fracture initiation pressure is increased, tensile strength increased, Young's modulus and Poisson Ratio are favorably altered to improve formation ductility, fracture toughness, and compressive strength, and the permeability is reduced.

After a zone is treated it can be pressure tested and drilling can be resumed. It may be appropriate at this point to use a higher or lower mud weight, as will be apparent to those skilled in the art.

The following examples will serve to illustrate the invention disclosed herein. The examples are intended only as a means of illustration and should not be construed as limiting the scope of the invention in any way. Those skilled in the art will recognize many variations that may be made without departing from the spirit of the disclosed invention.

Examples 1 through 3 demonstrate the use in the field of the formulation utilizing at least one melamine-formaldehyde resin, or a blend of melamine-formaldehyde resins, optionally blended with a polyol and/or poly(hydroxy) ether, soluble in non-aqueous drilling fluids and invert emulsion drilling fluids containing $C_7$ to $C_{20}$ olefins, esters, paraffinic oils and blends thereof, and also soluble in diesel and mineral oils and blends thereof with $C_7$ to $C_{20}$ olefins, esters, and paraffinic oils; and optionally other additives selected from one or more of coupling agents, suspending agents, dyes, weighting agents, lost circulation materials, and other additives known in the art.

Example 1

Multiple treatments were performed in seven wells having uncased wellbore intervals between the depths of about 9,000 feet and about 18,000 feet, in a southern Texas gas field. Static geothermal temperatures between about 235 to 320° F. were encountered in this depth range. Multiple geologic formations are exposed within this depth interval in these wells. A series of permeable sandstone formations separated by shale and silt intervals generally describes the exposed formations in the wellbore. Hydrocarbons, primarily gas, from some of the exposed sands have been produced from other wells in the field. Production has decreased the formation pore pressure of these formations and reduced their fracture initiation and propagation pressure. Other exposed, permeable, hydrocarbon-bearing sands have not been produced and are at their original formation pore pressure and corresponding higher fracture initiation and propagation pressures. In some cases the drilling fluid weight necessary to balance the pore pressure of unproduced formations exceeds the fracture initiation and propagation pressure of previously produced formations. Normally, casings are run and cemented in the wellbore to isolate geologic formations with such differences in pressure and strength.

Failure to isolate formations with these differences in pressure and properties generally leads to fracturing of the weaker formation causing lost circulation. If the lost circulation cannot be cured or controlled, then uncontrolled flow of hydrocarbons (or other fluids under pressure) can occur between formations or to the surface. Such uncontrolled flow from a wellbore is referred to in the art as a blowout. In Well No. 1 of this study, the weaker formation was fractured by the higher mud weight required to control the pore pressure from a previously unproduced formation. Depth of the lost circulation zone was at approximately 12,000 feet, which was 3,000 feet deeper than the shoe of the previous casing string. Lost circulation was severe and difficult to control. A resin-based lost circulation treatment was performed to repair the fractured formation. The formulation used for this treatment was:

Per finished (42 gallon) barrel of fluid:

| | | |
|---|---|---|
| 13.4 | gallons | Diesel oil invert drilling fluid (16.7 lb/gal) |
| 16.8 | gallons | Resimene 755 Melamine-Formaldehyde Resin |
| 4.2 | gallons | Ethylene glycol monobutyl ether |
| 323.6 | pounds | Hematite |
| 3.06 | pounds | Para-toluene sulfonic acid catalyst (40% by weight in isopropyl alcohol) |
| 10 | pounds | Magma Fiber Regular (Large fiber lost circulation material) |
| 5 | pounds | Magma Fiber Fine (Small fiber lost circulation material) |

The original drilling fluid weight was 16.7 lb/gal. Addition of the melamine-formaldehyde resin, ethylene glycol monobutyl ether solvent and catalyst reduced the solution weight. Hematite (iron oxide) was added as a weighting agent to increase the weight of the final mixture back to 16.7 lb/gal.

The treatment was performed as follows:

Pull end of drill string up to 9,000 feet just inside the shoe of the previous 9⅝ inch casing string.

Pump 50 bbls of resin mixture (formulation above) down the drillpipe to a depth where the leading edge of the mixture is 10 bbls above the end of the drill string.

Note: No, spacer fluids were required ahead of or behind the resin mixture to separate the treatment fluid from the drilling fluid in the wellbore. This is because the resin is completely soluble in the drilling fluid and was combined with the drilling fluid to make the treatment mixture. The mutual solvent was included in this first formulation to insure complete compatibility between the drilling fluid and resin mixture. However, the solvent was omitted from later jobs due to complete compatibility of the resin with the drilling fluid and the lack of water in most formations being treated.

Close in the annular blowout preventer to stop circulation of fluid out of the well and prepare to squeeze the resin treatment into the lost circulation zone.

Squeeze the 50 bbls of resin mixture containing lost circulation material into the loss zone by pumping drilling fluid down the drill pipe to displace the resin mixture out of the pipe into the formation.

Once all the resin mixture has been displaced from the drill pipe, pump an additional 10 bbls of fluid down the drill pipe to displace the trailing edge of the resin mixture to a depth below the end of the drill pipe but above the top of the lost circulation zone.

Pump an additional 10 bbls of displacement down the annulus to complete displacement of the trailing edge of the resin mixture to just above the top of the lost circulation zone.

Allow the well to remain shut-in for 8 hours prior to resuming drilling operations.

This treatment did not completely cure the lost circulation. However, it did seal off exposed high-pressure zones that were flowing gas into the wellbore. Therefore, the risk of loss of well control was accomplished by reducing the losses and sealing off the flow zones. No other treatment of this troublesome interval was required.

Example 2

In Well No. 2 of this study, an exposed lower pressure (depleted) formation was fractured by a high drilling fluid weight required to control an exposed high-pressure zone. This caused lost circulation and prevented further drilling operations to deepen the wellbore. A resin-based lost circulation treatment was performed to repair the fractured formation. The formulation used for this treatment was:

Per finished (42 gallon) barrel of fluid:

| | | |
|---|---|---|
| 13.4 | gallons | Diesel oil invert drilling fluid (16.8 lb/gal) |
| 16.8 | gallons | Resimene 755 Melamine-Formaldehyde Resin |
| 4.2 | gallons | Ethylene glycol monobutyl ether |
| 328.3 | pounds | Hematite |
| 7.65 | pounds | Formic acid catalyst (88%) |
| 5 | pounds | Magma Fiber Regular (Large fiber lost circulation material) |
| 5 | pounds | Magma Fiber Fine (Small fiber lost circulation material) |

The original drilling fluid weight was 16.8 lb/gal. Addition of the melamine-formaldehyde resin, ethylene glycol monobutyl ether solvent and catalyst reduced the solution weight. Hematite (iron oxide) was added as a weighting agent to increase the weight of the final mixture back to 16.8 lb/gal.

Treatment was performed using the following procedure:

Pull end of drill string up to 300 feet above the lost circulation zone.

Pump 35 bbls of resin mixture (formulation above) down the drillpipe to a depth where the leading edge of the mixture is 10 bbls above the end of the drill string.

Note: No spacer fluids were required ahead of or behind the resin mixture to separate the treatment fluid from the drilling fluid in the wellbore.

Close in the annular blowout preventer to stop circulation of fluid out of the well and prepare to squeeze the resin treatment into the lost circulation zone.

Squeeze the 35 bbls of resin mixture containing lost circulation material into the loss zone by pumping drilling fluid down the drill pipe to displace the resin mixture out of the pipe into the formation.

Displace the trailing edge of the resin mixture to a point 100 feet above the top of the lost circulation zone.

Allow the well to remain shut-in for 0.8 hours prior to resuming drilling operations.

After the treatment, the drilling fluid weight was increased to 17.2 lb/gal and the wellbore was deepened to its target total depth with no lost circulation.

Example 3

Well No. 3 utilized resin treatments to strengthen a formation prior to inducing lost circulation. In this well, a resin treatment was pumped to cure a lost circulation zone and seal off a high-pressure flow zone at shallower depths. Sealing off the flow zone allowed a lower drilling fluid weight to be used to drill deeper. The lower mud weight allowed a weaker formation at a deeper depth to be drilled-through without fracturing the formation and inducing lost circulation.

After drilling through the weaker formation at the deeper depth, the weak formation was treated with a resin mixture to strengthen it and increase its near-wellbore fracture initiation pressure. The following mixture was used:

| | | |
|---|---|---|
| 20.5 | gallons | Diesel oil invert drilling fluid (16.0 lb/gal) |
| 16.8 | gallons | Resimene 755 Melamine Formaldehyde Resin |
| 161 | pounds | Hematite |
| 7.65 | pounds | Para-toluene sulfonic acid catalyst (40% by weight in isopropyl alcohol) |

A spot-and-squeeze technique was used for this treatment. The procedure follows:

Run drillstring and tag total depth. Total depth of the wellbore was approximately 100 feet below the bottom of the weak interval to be treated. The weak formation was approximately 150 feet thick.

Pull up drillstring 50 feet above total depth.

Spot 30 bbls of the resin mixture across and extending above the top of the weak formation. The column length of the resin mixture was approximately 400 ft. Excess volume was spotted to allow a volume of the resin to be injected into the matrix of the formation.

Spotting the fluid is accomplished by pumping the resin mixture into the drill string, pumping a fluid (typically the drilling fluid) behind to displace the resin mixture out the end of the drill string and out into the annulus between the wellbore and drill string. The annulus is open at the surface to allow fluid to be circulated out of the wellbore as the resin mixture is placed.

After spotting the resin mixture in the wellbore, the drill string was pulled up to the previous casing shoe.

The annular blowout preventer was closed.

Fluid was pumped down the drill string to squeeze the resin into the weak formation.

Radial penetration of the resin into the wellbore could be calculated from the volume of fluid squeezed into the formation, formation porosity, formation thickness (height) and wellbore diameter. Calculated radial penetration distance for the resin in this treatment was 0.6 m (1.9 feet).

After squeezing resin into the formation, the well was shut in for 6 hours prior to cleaning set resin out of the wellbore and resuming drilling operations to deepen the well.

The drilling fluid weight was increased to over 17 lb/gal during drilling operations to total depth and no lost circulation occurred. The resin treatment effectively strengthened the formation near the wellbore.

The process described above for Well No. 3 in this test study was repeated in four more wells with similar, successful results.

The invention claimed is:

1. A composition useful for creating geosynthetic composites in-situ, said composition including:
   a) at least one reactive component selected from:
      at least one melamine-formaldehyde resin, or a blend of melamine-formaldehyde resins blended with at least one polyol and/or poly (hydroxy) ether or a blend of polyols and poly(hydroxy) ether(s);
      wherein said selected reactive component is soluble in non-aqueous drilling fluids and invert emulsion drilling fluids containing $C_7$ to $C_{20}$ olefins, esters, paraffinic oils and blends thereof, and also soluble in diesel and mineral oils and blends thereof with $C_7$ to $C_{20}$ olefins, esters, and paraffinic oils; and
   b) at least one additional additive selected from the group consisting of coupling agents, suspending agents, dyes, weighting agents, lost circulation materials, and combinations thereof;
   further comprising a saturated thermoplastic elastomer.

2. The composition of claim 1, further including one or more components selected from catalysts and inhibitors, individually, and combinations thereof.

3. The composition of claim 2 wherein a catalyst is selected from the group consisting of free radical initiators, acid or strong acid catalysts, organic catalyst and mineral acids.

4. The composition of claim 3 wherein a free radical catalyst is utilized selected from organic peroxy-compounds.

5. The composition of claim 4 wherein the organic peroxycompounds are selected from the group consisting of benzoyl peroxide, dibenzoyl peroxide, diacetyl peroxide, di-t-butyl peroxide, cumyl peroxide, dicumyl peroxide, dilauryl peroxide, t-butyl hydroperoxide, methyl ketone peroxide, acetylacetone peroxide, methylethyl ketone peroxide, dibutylperoxyl cyclohexane, di(2,4-dichlorobenzoyl)peroxide, diisobutyl peroxide, t-butyl perbenzoate, and t-butyl peracetate.

6. The composition of claim 3 wherein an acid catalyst is utilized selected from the group consisting of alkyl and aromaticsulfonic acids and para-toluene sulfonic acid.

7. The composition of claim 3 wherein the acid catalyst is selected from the group consisting of formic, boric, phosphoric, oxalic and acid salts of hexamethylenetetramine.

8. The composition of claim 1 wherein the melamine-formaldehyde comprises an amino crosslinker designed for thermosetting surface coatings and is solvent soluble.

9. The composition of claim 8 wherein the melamine-formaldehyde resin exhibits a versatile catalyzed cure response in a range between about 100° F. to over 600° F.

10. The composition of claim 9 wherein the melamine-formaldehyde resin exhibits a cure response in the range between about 150° F. and 350° F.

11. The composition of claim 1 further comprising a mutual solvent.

12. The composition of claim 11 wherein the concentration of mutual solvent is in the range of from 0 to about 65 wt percent.

13. The composition of claim 12 wherein the concentration of mutual solvent is in the range of from about 10 to 55 wt percent.

14. The composition of claim 13 wherein the concentration of mutual solvent is in the range of from about 20 to 50 wt percent.

15. The composition of claim 1 further comprising a coupling agent.

16. The composition of claim 15 wherein the coupling agent is a silane coupling agent.

17. The composition of claim 16 wherein the silane coupling agent is selected from the group consisting of vinyltrimethoxysilane, vinyltriethoxysilane, vinyltris(β-methoxyethoxy)silane, vinylmethyldimethoxysilane, vinylmethyldiethoxysilane, δ-glycidoxypropyltrimethoxysilane, δ-glycidoxypropylmethyldimethoxysilane, δ-methacryloxypropyltrimethoxysilane, δ-methacryloxypropylmethyldimethoxysilane, acryloxypropyltrimethoxysilane, acryloxypropylmethyldimethoxysilane, N-β-(aminoethyl)-δ-aminopropyltrimethoxysilane, N-β-(aminoethyl)-δ-aminopropyltriethoxysilane, N-β-(aminoethyl)-δ-aminopropylmethyldimethoxysilane, and N-β-(aminoethyl)-δ-aminopropylmethyldiethoxysilane, and mixtures thereof.

18. The composition of claim 16 wherein the silane coupling agent is selected from the group consisting of bifunctional sulfur-containing organo silanes.

19. The composition of claim 16 wherein the silane coupling agent is selected from bis-(3-triethoxy-silylpropyl)tetrasulfide, bis-(3-trimethoxy-silyl propyl) tetrasulfide, and bis-(3-trimethoxy-silylpropyl)tetrasulfide grafted silica.

20. The composition of claim 15 wherein the concentration of coupling agent is in the range of from about 0 to 10 wt percent.

21. The composition of claim 1 further comprising a suspending agent.

22. The composition of claim 21 wherein the suspending agents are selected from the group consisting of organophilic clays, amine treated clays, oil soluble polymers, polyamide resins, polycarboxylic acids, and soaps.

23. The composition of claim 21 wherein the suspending agents are present in an amount in the range from about 0 to 15% by weight in the formulations.

24. The composition of claim 1 further comprising a dye.

25. The composition of claim 1 further comprising weighting agents.

26. The composition of claim 25 wherein the weighting agents are selected from the group consisting of, galena, hematite, magnetite, iron oxides, ilmenite, barite, siderite, celestite, dolomite, calcite, manganese oxides, magnesium oxide, zinc oxide, zirconium oxides, spinels and the like, individually or combinations thereof.

27. The composition of claim 25 wherein the weighting agents are added in an amount of from about 5 to 500 lbs/bbl.

28. The composition of claim 1 further comprising lost circulation materials.

29. A composition useful for creating geosynthetic composites in-situ, said composition including:
 a) at least one reactive component selected from:
  at least one melamine-formaldehyde resin, or a blend of melamine-formaldehyde resins blended with at least one polyol and/or poly(hydroxy)ether or a blend of polyols and poly(hydroxy)ether(s);
  wherein said selected reactive component is soluble in non-aqueous drilling fluids and invert emulsion drilling fluids containing $C_7$ to $C_{20}$ olefins, esters, paraffinic oils and blends thereof, and also soluble in diesel and mineral oils and blends thereof with $C_7$ to $C_{20}$ olefins, esters, and paraffinic oils; and
 b) at least one additional additive selected from the group consisting of coupling agents, suspending agents, dyes, weighting agents, lost circulation materials, and combinations thereof;
wherein the selected reactive component is blended with a polyol that is soluble in the reactive component and also in a hydrocarbon phase of the drilling/completion fluid.

30. The composition of claim 29 wherein the polyol is selected from the group consisting of ethylene glycol, propylene glycol, diethylene glycol, triethylene glycol, polyethylene glycol, polypropylene glycol, and polyethylene-propylene glycol.

31. The composition of claim 29 wherein the amount of polyol is in the range of 0 to 50% by volume.

32. The composition of claim 31 wherein the amount of polyol is in the range of 5 to 35% by volume.

33. The composition of claim 32 wherein the amount of polyol is in the range of 10 to 30% by volume.

34. A composition useful for creating geosynthetic composites in-situ, said composition including:
 a) at least one reactive component selected from:
  at least one melamine-formaldehyde resin, or a blend of melamine-formaldehyde resins blended with at least one polyol and/or poly(hydroxy)ether or a blend of polyols and poly(hydroxy)ether(s);
  wherein said selected reactive component is soluble in non-aqueous drilling fluids and invert emulsion drilling fluids containing $C_7$ to $C_{20}$ olefins, esters, paraffinic oils and blends thereof, and also soluble in diesel and mineral oils and blends thereof with $C_7$ to $C_{20}$ olefins esters and paraffinic oils; and
 b) at least one additional additive selected from the group consisting of coupling agents, suspending agents, dyes, weighting agents, lost circulation materials, and combinations thereof;
wherein the reactive component is blended with a poly(hydroxy)ether that is soluble in the reactive component and also in a hydrocarbon phase of the drilling/completion fluid.

35. The composition of claim 34 wherein the poly(hydroxy)ether is selected from poly(hydroxy)ethers characterized by a high molecular weight.

36. The composition of claim 34 wherein the poly(hydroxy)ether is selected from those characterized by a predominantly linear structure.

37. The composition of claim 34 wherein the poly(hydroxy)ether is characterized by ether linkages and pendant hydroxyl groups that promote wetting and bonding to polar substrates and fillers.

38. The composition of claim 34 wherein the poly(hydroxy)ether is present in an amount in the range of 0 to 50% by volume.

39. The composition of claim 38 wherein the poly(hydroxy)ether is present in an amount in the range of 5 to 35% by volume.

40. The composition of claim 39 wherein the poly(hydroxy)ether is present in an amount in the range of 10 to 30% by volume.

41. A composition useful for creating geosynthetic composites in-situ, said composition including:
 a) at least one reactive component selected from:
  at least one melamine-formaldehyde resin, or a blend of melamine-formaldehyde resins blended with at least one polyol and/or poly(hydroxy)ether or a blend of polyols and poly(hydroxy)ether(s);
  wherein said selected reactive component is soluble in non-aqueous drilling fluids and invert emulsion drilling fluids containing $C_7$ to $C_{20}$ olefins esters paraffinic oils and blends thereof, and also soluble in diesel and mineral oils and blends thereof with $C_7$ to $C_{20}$ olefins, esters, and paraffinic oils; and
 b) at least one additional additive selected from the group consisting of coupling agents, suspending agents, dyes, weighting agents, lost circulation materials, and combinations thereof;
further comprising a mutual solvent selected from the group consisting of glycol ethers, polyglycol ethers or glycol ether esters.

42. The composition of claim 41 wherein the mutual solvent is selected from the group consisting of ethylene glycol monobutyl ether and propylene glycol methyl ether acetate.

43. A composition useful for creating geosynthetic composites in-situ, said composition including:
 a) at least one reactive component selected from:
  at least one melamine-formaldehyde resin, or a blend of melamine-formaldehyde resins blended with at least one polyol and/or poly(hydroxy)ether or a blend of polyols and poly(hydroxy)ether(s);
  wherein said selected reactive component is soluble in non-aqueous drilling fluids and invert emulsion drilling fluids containing olefins, esters, paraffinic oils and blends thereof, and also soluble in diesel and mineral oils and blends thereof with $C_7$ to $C_{20}$ olefins esters and paraffinic oils; and
 b) at least one additional additive selected from the group consisting of coupling agents, suspending agents, dyes, weighting agents, lost circulation materials, and combinations thereof;
further including an inhibitor selected from the group consisting of quinones, hydroquinones, and catechols.

44. The composition of claim 43 wherein the inhibitor is selected from the group consisting of benzoyl quinone, para-benzoquineone, methyl ethyl hydroquinone and t-butyl catechol.

45. A composition useful for creating geosynthetic composites in-situ, said composition including:
 a) at least one reactive component selected from:
  at least one melamine-formaldehyde resin, or a blend of melamine-formaldehyde resins blended with at least one polyol and/or poly(hydroxy)ether or a blend of polyols and poly(hydroxy)ether(s);
  wherein said selected reactive component is soluble in non-aqueous drilling fluids and invert emulsion drilling fluids containing $C_7$ to $C_{20}$ olefins, esters, paraffinic oils and blends thereof, and also soluble in diesel and mineral oils and blends thereof with $C_7$ to $C_{20}$ olefins, esters, and paraffinic oils; and
 b) at least one additional additive selected from the group consisting of coupling agents, suspending agents, dyes, weighting agents, lost circulation materials, and combinations thereof;
further comprising at least one reactive ester having at least one carbon-carbon double bond selected from vinyl esters of versatic acids and vinyl esters of long chain fatty acids, individually, or a blend thereof, at least one unsaturated thermoplastic elastomer containing at least one carbon-carbon double bond soluble in the reactive ester; and at least one di- or tri-functional acrylate or methacrylate monomer.

* * * * *